(12) United States Patent
Imazaki et al.

(10) Patent No.: US 10,270,104 B2
(45) Date of Patent: Apr. 23, 2019

(54) POSITIVE ELECTRODE FOR SODIUM ION SECONDARY BATTERY AND SODIUM ION SECONDARY BATTERY

(71) Applicant: Sumitomo Electric Industries, Ltd., Osaka-shi (JP)

(72) Inventors: Eiko Imazaki, Osaka (JP); Shoichiro Sakai, Osaka (JP); Atsushi Fukunaga, Osaka (JP); Koji Nitta, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 150 days.

(21) Appl. No.: 15/502,467

(22) PCT Filed: Jul. 22, 2015

(86) PCT No.: PCT/JP2015/070756
§ 371 (c)(1),
(2) Date: Feb. 7, 2017

(87) PCT Pub. No.: WO2016/021405
PCT Pub. Date: Feb. 11, 2016

(65) Prior Publication Data
US 2017/0222228 A1    Aug. 3, 2017

(30) Foreign Application Priority Data
Aug. 8, 2014 (JP) ................ 2014-162384

(51) Int. Cl.
*H01M 4/62* (2006.01)
*C01G 45/00* (2006.01)
(Continued)

(52) U.S. Cl.
CPC ............ *H01M 4/628* (2013.01); *C01G 45/00* (2013.01); *C01G 45/02* (2013.01);
(Continued)

(58) Field of Classification Search
CPC .... H01M 10/054; H01M 10/05; H01M 4/505; H01M 4/525; H01M 4/485; H01M 4/366;
(Continued)

(56) References Cited

U.S. PATENT DOCUMENTS 9,142,860 B2 * 9/2015 Kuze ................... H01M 2/1653
9,203,088 B2 * 12/2015 Yabuuchi ........... C01G 45/1228
(Continued)

FOREIGN PATENT DOCUMENTS

JP    52-241262 A    10/1987
JP    63-000965 A    1/1988
(Continued)

OTHER PUBLICATIONS

International Search Report in counterpart International Application No. PCT/JP2015/070756, dated Oct. 27, 2015.

*Primary Examiner* — Amanda C. Walke
(74) *Attorney, Agent, or Firm* — Baker Botts L.L.P.; Michael A. Sartori

(57) ABSTRACT

A positive electrode for a sodium ion secondary battery includes a positive electrode active material that intercalates and deintercalates sodium ions, a conductive assistant, a binder, and a carboxylic acid, the binder containing a vinylidene fluoride-based polymer, the carboxylic acid having at least one of a boiling point and a thermal decomposition point, and whichever of the boiling point and the thermal decomposition point is lower being higher than 150° C. The carboxylic acid is preferably at least one selected from the group consisting of hydroxy acids and polycarboxylic acids.

2 Claims, 4 Drawing Sheets

(51) Int. Cl.
*C01G 45/02* (2006.01)
*C01G 49/00* (2006.01)
*C01G 53/00* (2006.01)
*H01M 4/525* (2010.01)
*H01M 10/054* (2010.01)
*H01M 4/38* (2006.01)
*H01M 4/485* (2010.01)
*H01M 10/05* (2010.01)
*H01M 4/02* (2006.01)

(52) U.S. Cl.
CPC ..... *C01G 49/0018* (2013.01); *C01G 49/0072* (2013.01); *C01G 53/50* (2013.01); *H01M 4/381* (2013.01); *H01M 4/485* (2013.01); *H01M 4/525* (2013.01); *H01M 4/62* (2013.01); *H01M 4/623* (2013.01); *H01M 4/625* (2013.01); *H01M 10/05* (2013.01); *H01M 10/054* (2013.01); *H01M 2004/028* (2013.01)

(58) Field of Classification Search
CPC ........ H01M 4/628; H01M 4/381; H01M 4/62; H01M 4/623; H01M 4/625
USPC ......................................................... 429/221
See application file for complete search history.

(56) References Cited

U.S. PATENT DOCUMENTS

| | | | |
|---|---|---|---|
| 2015/0111097 A1* | 4/2015 | Park | H01M 4/485 429/188 |
| 2015/0221940 A1* | 8/2015 | Shimonishi | H01M 4/625 429/220 |
| 2016/0181608 A1* | 6/2016 | Kendrick | H01M 4/525 252/182.1 |
| 2017/0025678 A1* | 1/2017 | Gruar | C01G 49/0072 |
| 2017/0092947 A1* | 3/2017 | Kendrick | C01G 19/00 |
| 2017/0187039 A1* | 6/2017 | Sun | H01M 4/0471 |
| 2017/0207443 A1* | 7/2017 | Shen | H01M 4/0471 |
| 2017/0271670 A1* | 9/2017 | Obrovac | H01M 4/485 |
| 2017/0317350 A1* | 11/2017 | Ceder | H01M 4/525 |
| 2017/0373322 A1* | 12/2017 | Zhamu | H01M 4/628 |
| 2018/0040882 A1* | 2/2018 | Kim | H01M 4/364 |
| 2018/0205086 A1* | 7/2018 | Ushijima | H01M 4/13 |

FOREIGN PATENT DOCUMENTS

| | | |
|---|---|---|
| JP | H09-306502 A | 11/1997 |
| JP | H10-79244 A | 3/1998 |
| JP | 2012-054208 A | 3/2012 |
| JP | 2012-089411 A | 5/2012 |
| JP | 2012-134129 A | 7/2012 |
| WO | 2011/024797 A1 | 3/2011 |

* cited by examiner

POSITIVE ELECTRODE FOR SODIUM ION SECONDARY BATTERY AND SODIUM ION SECONDARY BATTERY

TECHNICAL FIELD

The present invention relates to a positive electrode for a sodium ion secondary battery including a positive electrode containing a vinylidene fluoride-based polymer and relates to a sodium ion secondary battery.

BACKGROUND ART

In recent years, there has been increasing demand for nonaqueous electrolyte secondary batteries as high-energy-density batteries capable of storing electrical energy. Among nonaqueous electrolyte secondary batteries, lithium-ion secondary batteries have the advantage of being light in weight and having high electromotive forces. The price of lithium resources is rising in association with the expansion of the market for lithium-ion secondary batteries. Thus, sodium ion secondary batteries containing a more inexpensive, stable sodium compound as a positive electrode active material are receiving attention.

In lithium ion secondary batteries and sodium ion secondary batteries, positive electrodes contain positive electrode active materials, conductive assistants, binders, and so forth. As positive electrode active materials, lithium compounds, such as lithium-containing transition metal oxides, are used in lithium ion secondary batteries, and sodium compounds, such as sodium-containing transition metal oxides, are used in sodium ion secondary batteries. As binders, vinylidene fluoride-based polymers, such as polyvinylidene fluoride (PVDF), are typically used. Lithium compounds and sodium compounds used as positive electrode active materials are basic, so the use of vinylidene fluoride-based polymers as binders causes gelation, in some cases.

PTLs 1 and 2 each state that an organic acid or inorganic acid is added to a positive electrode mixture in order to inhibit gelation when a vinylidene fluoride-based polymer is used in a positive electrode of a lithium ion secondary battery. In PTL 1, maleic acid, citraconic acid, or malonic acid is used as the organic acid. In PTL 2, acetic acid is used as the organic acid, and phosphoric acid, sulfuric acid, or the like is used as the organic acid.

PTL 3 states that in an electrode for a sodium ion secondary battery containing a sodium-containing transition metal compound serving as an electrode active material, a polymer that does not have a structural unit derived from vinylidene halide is used as a binder.

CITATION LIST

Patent Literature

PTL 1: Japanese Unexamined Patent Application Publication No. 9-306502
PTL 2: Japanese Unexamined Patent Application Publication No. 10-79244
PTL 3: Japanese Unexamined Patent Application Publication No. 2012-134129

SUMMARY OF INVENTION

Technical Problem

In sodium ion secondary batteries, in the case where vinylidene fluoride-based polymers are used as binders, gelation can occur significantly at the time of preparing a positive electrode mixture. Thus, in PTL 3, a binder free from a vinylidene fluoride unit is used. When the positive electrode mixture gels, the gelled positive electrode mixture cannot be applied to a positive electrode current collector. Even if the gelled positive electrode mixture can be applied, the dispersion states of components in the positive electrode mixture vary, thereby degrading battery characteristics.

In PTLs 1 or 2 that relates to a lithium ion secondary battery, maleic acid, malonic acid, acetic acid, or the like is added in order to inhibit gelation of the positive electrode mixture. In the case where the acid is added to a positive electrode mixture for a sodium ion secondary battery, although gelation is inhibited to some extent, the discharge capacity and/or cycle characteristics in early stages are reduced.

It is an abject to provide a positive electrode for a sodium ion secondary battery, the positive electrode inhibiting the gelation of a positive electrode mixture and inhibiting a reduction in the discharge capacity and degradation in the cycle characteristics of the sodium ion secondary battery in early stages.

Solution to Problem

An aspect of the present invention relates to a positive electrode for a sodium ion secondary battery including a positive electrode active material that intercalates and deintercalates sodium ions, a conductive assistant, a binder, and a carboxylic acid, the binder containing a vinylidene fluoride-based polymer, the carboxylic acid having at least one of a boiling point and a thermal decomposition point, and whichever of the boiling point and the thermal decomposition point is lower being higher than 150° C.

Another aspect of the present invention relates to a sodium ion secondary battery including the positive electrode, a negative electrode, a separator arranged between the positive electrode and the negative electrode, and a nonaqueous electrolyte having sodium ion conductivity.

Advantageous Effects of Invention

In the foregoing aspects, even when a vinylidene fluoride-based polymer is used as a binder in a positive electrode for a sodium ion secondary battery, gelation is inhibited. Furthermore, a reduction in the discharge capacity and degradation in the cycle characteristics of the sodium ion secondary battery in early stages are inhibited.

DESCRIPTION OF EMBODIMENTS

[Description of Embodiments of Invention]

Figure 1:
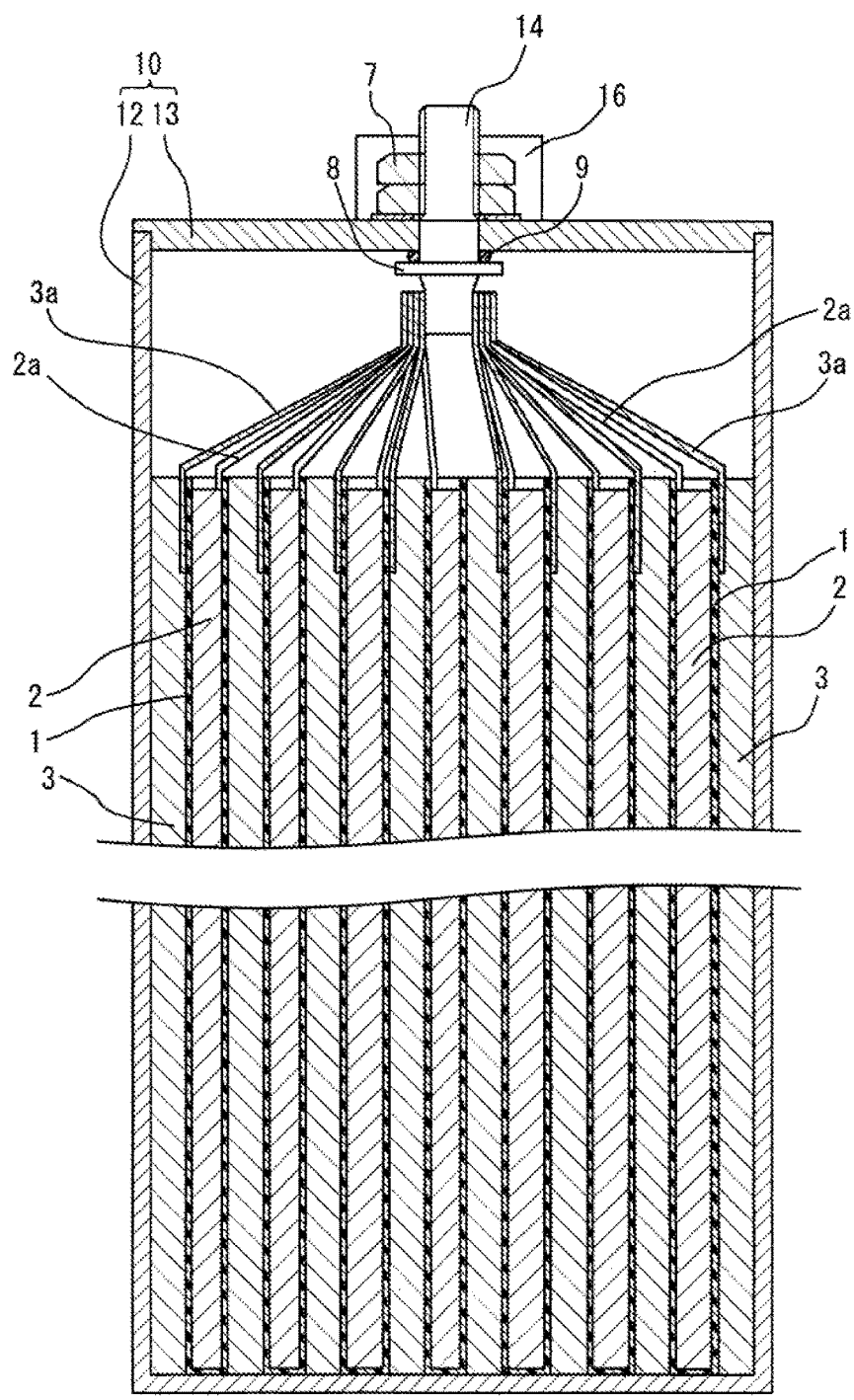
FIG. 1 is a longitudinal sectional view schematically illustrating a sodium ion secondary battery according to an embodiment of the present invention.

First, embodiments of the present invention will be listed and described below.

An embodiment of the present invention relates to (1) a positive electrode for a sodium ion secondary battery, the positive electrode including a positive electrode active material that intercalates and deintercalates sodium ions, a conductive assistant, a binder, and a carboxylic acid. The binder contains a vinylidene fluoride-based polymer, and the carboxylic acid has at least one of a boiling point and a thermal decomposition point, whichever of the boiling point and the thermal decomposition point is lower being higher than 150° C. The vinylidene fluoride-based polymer refers to a polymer containing monomer units (vinylidene fluoride units) derived from vinylidene fluoride.

The "the carboxylic acid has at least one of a boiling point and a thermal decomposition point, whichever of the boiling point and the thermal decomposition point is lower being higher than 150° C." indicates that when the carboxylic acid has only one of the boiling point and the thermal decomposition point, the one is higher than 150° C. and that when the carboxylic acid has both of the boiling point and the thermal decomposition point, both are higher than 150° C.

A positive electrode active material that intercalates and deintercalates sodium ions is typically basic. Thus, when the positive electrode active material is used in combination with a binder containing a vinylidene fluoride-based polymer, a positive electrode mixture gels. A vinylidene fluoride-based polymer has a tendency to form a polyene structure by abstraction of fluorine under basic conditions. Thereby, gelation occurs.

When the positive electrode mixture gels, the positive electrode mixture cannot be supported on (specifically, applied to or charged into) a positive electrode current collector at the time of the production of a positive electrode. Even if the positive electrode mixture can be supported on the positive electrode current collector, a positive electrode mixture layer having uniform distributions of constituent components thereof cannot be formed. Even if substantially no gelation occurs at the time when the positive electrode mixture is supported on the positive electrode current collector, gelation can occur in the course of a step of drying the positive electrode mixture to produce the positive electrode, thereby possibly degrade the characteristics of the positive electrode. When the binder gels, the binder is easily degraded, thereby affecting the long-term characteristics of the battery. In the case where the gelation of the binder causes nonuniform distributions of constituent components in the positive electrode, resistance in intercalating and deintercalating sodium ions is increased at an interface between the positive electrode and an electrolyte, and the conductivity of the positive electrode is reduced. This leads to a reduction in discharge capacity in early states. When charge and discharge are repeated in such a state, the capacity is reduced (in other words, the cycle characteristics are degraded) by the peeling off of the positive electrode mixture from the positive electrode current collector and the detachment of particles of the positive electrode active material.

In the embodiment of the present invention, the use of the carboxylic acid inhibits the gelation of the positive electrode mixture in the course of a production process of the positive electrode despite the use of a vinylidene fluoride-based polymer. One or both of the boiling point and the thermal decomposition point of the carboxylic acid are high, so that the carboxylic acid is left in the resulting positive electrode. Thus, after the positive electrode mixture is supported on the positive electrode current collector and until the positive electrode is completed, the progress of gelation is also inhibited, thereby resulting in the positive electrode having good dispersion states (that is, better uniformity) of the constituent components. The carboxylic acid is not easily decomposed in the production process of the positive electrode, so that a side reaction is inhibited in the battery. Accordingly, the discharge capacity and the cycle characteristics of the sodium ion secondary battery in the early stages are inhibited.

(2) The carboxylic acid preferably contains at least one selected from the group consisting of hydroxy acids and polycarboxylic acids. (3) The carboxylic acid preferably includes two or more carboxy groups. The use of the carboxylic acid more effectively inhibits gelation.

(4) Whichever of the boiling point and the thermal decomposition point of the carboxylic acid is lower may be 170° C. or higher. That is, in the case where the carboxylic acid has only one of the boiling point and the thermal decomposition point, the one is preferably 170° C. or higher. In the case where the carboxylic acid has both of the boiling point and the thermal decomposition point, both are preferably 170° C. or higher. (5) The carboxylic acid containing citric acid is preferably used.

In the case where the carboxylic acid is used, after the positive electrode mixture is supported on the positive electrode current collector and until the positive electrode is completed, the effect of inhibiting the vaporization or decomposition of the carboxylic acid is enhanced. Accordingly, until the positive electrode is completed, the effect of inhibiting the gelation of the positive electrode mixture is enhanced to inhibit the formation of an impurity such as a decomposition product.

(6) In a preferred embodiment, the positive electrode active material contains at least one sodium-containing transition metal oxide, and the sodium-containing transition metal oxide is represented by formula (1): $Na_xMeO_2$ (where element Me represents at least two transition metal elements selected from the group consisting of Ni, Ti, Mn, Fe and Co and contains at least one of Ni and Fe, and x represents a proportion of Na with respect to the element Me). (7) The sodium-containing transition metal oxide preferably has a P2-type layered or O3-type layered crystal structure.

(8) Preferably, the positive electrode active material contains at least one of a first oxide and a second oxide, the first oxide is a sodium-containing transition metal oxide having a P2-type layered crystal structure, the element Me being a combination of Ni, Ti, and Mn, and the second oxide is a sodium-containing transition metal oxide having an O3-type layered crystal structure, the element Me being a combination of Fe and Co.

(9) The stoichiometric ratio of Ni to Ti to Mn in the first oxide may be 1/3:1/6:1/2, and the stoichiometric ratio of Fe to Co in the second oxide may be 1/2:1/2.

The positive electrode active material described in items (6) to (9) is highly basic. Thus, the gelation of the positive electrode mixture is liable to occur significantly. Even when the positive electrode active material that is liable to cause the gelation of the positive electrode mixture is used, the gelation of the positive electrode mixture is inhibited by combination with the carboxylic acid. This further enhances the effect of inhibiting a reduction in the discharge capacity and degradation in the cycle characteristics of the sodium ion secondary battery in early stages.

(10) Another embodiment of the present invention relates to a sodium ion secondary battery including the positive electrode, a negative electrode, a separator arranged between the positive electrode and the negative electrode, and a nonaqueous electrolyte having sodium ion conductivity. In the sodium ion secondary battery, the gelation of the positive electrode mixture at the positive electrode is inhibited, and the reduction in the discharge capacity and the degradation in the cycle characteristics in early stages are also inhibited.

[Details of Embodiments of Invention]

Specific examples of a molten salt battery according to embodiments of the present invention will be described below with appropriate reference to the drawings. The present invention is not limited to these examples. The present invention is indicated by the appended claims. It is intended to include any modifications within the scope and meaning equivalent to the scope of the claims.

(Positive Electrode for Sodium Ion Secondary Battery)

A positive electrode for a sodium ion secondary battery according to an embodiment of the present invention includes a positive electrode active material, a conductive assistant, a binder, and a carboxylic acid.

(Binder)

The binder contains a vinylidene fluoride-based polymer. The vinylidene fluoride-based polymer is not particularly limited as long as it contains vinylidene fluoride units. The vinylidene fluoride-based polymer may be a homopolymer of vinylidene fluoride (that is, PVDF) or a copolymer of vinylidene fluoride and a copolymerizable monomer.

Examples of the copolymerizable monomer include halogen-containing monomers (excluding vinylidene fluoride) and halogen-free copolymerizable monomers. Examples of halogen-containing monomers include chlorine-containing monomers, such as vinyl chloride; and fluorine-containing monomers, such as vinyl fluoride, trifluoroethylene, tetrafluoroethylene, chlorotrifluoroethylene, hexafluoropropylene, and perfluoroalkyl vinyl ether (e.g., perfluoromethyl vinyl ether). Examples of halogen-free copolymerizable monomers include olefins, such as ethylene and propylene; acrylic monomers, such as acrylic acid, methacrylic acid, and their esters and salts; and vinyl monomers, such as acrylonitrile, vinyl acetate, and styrene. These copolymerizable monomers may be used separately or in combination of two or more.

A vinylidene fluoride-based polymer has a tendency to form a polyene structure by abstraction of fluorine under basic conditions. The formation of the polyene structure causes the gelation (including cross-linking). In an embodiment of the present invention, even if a vinylidene fluoride-based polymer includes a vinylidene fluoride block that easily causes the formation of a polyene structure, the use of the carboxylic acid effectively inhibits gelation. That is, embodiments of the present invention are particularly suitable for the case where a vinylidene fluoride-based polymer contains a vinylidene fluoride block. Examples of such a vinylidene fluoride-based polymer include PVDF and/or block copolymers of vinylidene fluoride. As copolymerizable monomers used for the block copolymers of vinylidene fluoride, the monomers exemplified above may be used.

The vinylidene fluoride-based polymer preferably has a vinylidene fluoride unit content of, for example, 30% by mole or more, 50% by mole or more, or 70% by mole or more. The vinylidene fluoride-based polymer has a vinylidene fluoride unit content of 100% by mole or less. A high vinylidene fluoride unit content is liable to cause gelation. In embodiments of the present invention, even if such a vinylidene fluoride-based polymer that gels easily is used, the gelation is effectively inhibited.

The binder may contain a polymer (second polymer) other than the vinylidene fluoride-based polymer (first polymer). The binder has a vinylidene fluoride-based polymer content of, for example, 80% to 100% by mass.

The second polymer may be appropriately selected from known binders used for positive electrodes for sodium ion secondary batteries. Examples thereof include fluororesins (fluororesins other than vinylidene fluoride-based polymers), such as polytetrafluoroethylene; polyolefin resins; rubbery polymers, such as styrene-butadiene rubber; polyamide resins (such as aromatic polyamide); polyimide resins, such as polyimide and polyimide-amide; polyvinyl pyrrolidone; polyvinyl alcohol; and/or cellulose ethers (carboxyalkylcellulose and salts thereof, such as carboxymethylcellulose and sodium salts thereof).

The amount of the binder is not particularly limited and may be selected in the range of, for example, about 0.5 to about 15 parts by mass and preferably 1 to 12 parts by mass with respect to 100 parts by mass of the positive electrode active material from the viewpoint of easily achieving high bondability and capacity.

(Carboxylic Acid)

As the carboxylic acid, a carboxylic acid having at least one of a boiling point and a thermal decomposition point, whichever of the boiling point and the thermal decomposition point is lower being higher than 150° C., is used. The positive electrode is formed by allowing a positive electrode mixture to be supported on a positive electrode current collector, performing pressing in the thickness direction, and performing drying. The drying temperature after the pressing is typically about 100° C. to about 150° C. When the carboxylic acid is used, the carboxylic acid is left in the positive electrode. The use of the crystal structure that is left in the positive electrode after the drying inhibits gelation of the positive electrode mixture and the degradation of the binder. Although the reason is not clear, even when the carboxylic acid is left in the positive electrode, the carboxylic acid has little adverse effect on a battery reaction. Accordingly, the reduction in the discharge capacity and the degradation in the cycle characteristics of the sodium ion secondary battery in early stages are inhibited.

Whichever of the boiling point and the thermal decomposition point of the carboxylic acid is lower is preferably higher than 150° C. and more preferably 165° C. or higher or 170° C. or higher. When the carboxylic acid has only one of the boiling point and the thermal decomposition point, the one is preferably higher than 150° C. and more preferably 165° C. or higher or 170° C. or higher. When the carboxylic acid has both of the boiling point and the thermal decomposition point, both are preferably higher than 150° C. and more preferably 165° C. or higher or 170° C. or higher.

In the case where both of the boiling point and the thermal decomposition point of the carboxylic acid are high as described above, the carboxylic acid is easily left in the positive electrode. This is an advantage when the reduction in discharge capacity and the degradation in cycle characteristics in early stages are inhibited.

Examples of the carboxylic acid include hydroxy acids, such as citric acid and salicylic acid; monocarboxylic acids (for example, aromatic monocarboxylic acids), such as benzoic acid; and polycarboxylic acids (for example, aliphatic polycarboxylic acids, such as mesaconic acid and itaconic acid, and aromatic polycarboxylic acids, such as phthalic acid and terephthalic acid). The numbers of hydroxy groups and carboxy groups in a hydroxy acid are not particularly limited. The hydroxy acid may have one or two or more (for example, two, three, or four) hydroxy groups or carboxy groups. These carboxylic acids such as hydroxy acid may be used separately or in combination of two or more. Among them, the hydroxy acid and/or polycarboxylic acid is preferred. The number of carboxy groups is preferably two or more.

The carboxylic acid preferably contains citric acid. Citric acid and any other carboxylic acid described above may be combined. The boiling point and the thermal decomposition point of citric acid are 175° C. Thus, citric acid is easily left in the positive electrode and is less likely to cause a side reaction in the battery. The use of citric acid more effectively inhibits the reduction in the discharge capacity and the degradation in the cycle characteristics of the sodium ion secondary battery in early stages. The carboxylic acid preferably has a citric acid content of 90% by mass or more (for example, 90% to 100% by mass).

The amount of the carboxylic acid is, for example, 0.1 to 5 parts by mass and preferably 0.1 to 2 parts by mass with respect to 100 parts by mass of the positive electrode active material. The amount of the carboxylic acid is, for example, 10 to 90 parts by mass, preferably 10 to 50 parts by mass, and more preferably 15 to 40 parts by mass with respect to 100 parts by mass of the binder. When the amount of the carboxylic acid is within the range, the effect of inhibiting gelation is further enhanced, thereby easily improving the battery characteristics, such as the discharge capacity and the cycle characteristics in early stages, of the sodium ion secondary battery.

The carboxylic acid (first carboxylic acid) whose boiling point and decomposition point, whichever is lower, is higher than 150° C. may be used in combination with another carboxylic acid (second carboxylic acid), as needed. Examples of the second carboxylic acid include carboxylic acids having a boiling point or thermal decomposition point of 150° C. or lower, for example, aliphatic carboxylic acids, such as maleic acid, citraconic acid, and malonic acid. Furthermore, an inorganic acid (hydrochloric acid, phosphoric acid, sulfuric acid, or the like) may be used in combination, as needed. The amount of each of the second carboxylic acid and the inorganic acid is preferably 10 parts by mass or less and more preferably 5 parts by mass or less or 1 part by mass or less with respect to 100 parts by mass of the first carboxylic acid. When the amount of each of the second carboxylic acid and the inorganic acid is within the range, the battery characteristics of the sodium ion secondary battery are easily improved.

(Positive Electrode Active Material)

As the positive electrode active material, a positive electrode active material that intercalates and deintercalates sodium ions is used. As the positive electrode active material, a transition metal compound is preferred. The transition metal compound is not particularly limited and is preferably a compound having a layered structure in which sodium is intercalated into and deintercalated from an interlayer portion. Examples of the transition metal compound include known compounds that can be used as positive electrode active materials of sodium ion secondary batteries, for example, sulfides (e.g., transition metal sulfides, such as $TiS_2$ and $FeS_2$, and sodium-containing transition metal sulfides, such as $NaTiS_2$), oxides, sodium-containing transition metal oxoates, and sodium-containing transition metal halides (such as $Na_3FeF_6$). These positive electrode active materials may be used separately or in combination of two or more.

An example of the oxide is a sodium-containing transition metal oxide represented by formula (1): $Na_xMeO_2$ (where Me represents a transition metal element, and x represents a proportion of Na with respect to the element Me). In formula (1), the proportion of Na with respect to the element Me is represented by x. The ratio of Na to the element Me may vary to some extent. For example, the sodium-containing transition metal oxide represented by formula (1) includes a compound represented by formula (1a): $Na_{x-\alpha}Me_{1+\alpha}O_2$ (where $\alpha$ satisfies $-0.03 \leq \alpha \leq 0.03$). x (and x−α) varies, depending on charge and discharge.

Depending on charge and discharge, x can satisfy x=0, or x−α can satisfy x−α=0. In the present invention, however, the transition metal oxide represented by formula (1) is originally a sodium-containing transition metal oxide. Even though a state in which x=0 or x−α=0, depending on charge and discharge, is included, the transition metal oxide represented by formula (1) is referred to as the sodium-containing transition metal oxide. Furthermore, x>0 may be satisfied, and x−α>0 may be satisfied.

The transition metal element represented by the element Me is preferably at least one selected from the group consisting of Cr, Ni, Ti, Mn, Fe, and Co. Examples of the sodium-containing transition metal oxide include, in addition to sodium chromite ($NaCrO_2$), oxides represented by formula (1) where the element Me represents at least two selected from the group consisting of Ni, Ti, Mn, Fe, and Co. When the sodium-containing transition metal oxide represented by formula (1), where the element Me represents at least two selected from the group consisting of Ni, Ti, Mn, Fe, and Co, is used, in particular, the gelation of the positive electrode mixture occurs significantly at the time of preparing the positive electrode mixture. In embodiments of the present invention, even if the positive electrode active material that is liable to cause the positive electrode mixture to gel significantly, the use of the carboxylic acid effectively inhibits gelation of the positive electrode mixture, thereby inhibiting the degradation in the characteristics of the sodium ion secondary battery. Furthermore, this is an advantage when the capacity of the sodium ion secondary battery is increased.

In the sodium-containing transition metal oxide represented by formula (1) (and formula (1a)), Na and/or the element Me may be partially replaced with another element (for example, an alkali metal element other than Na, a transition metal element other than those described above, and/or a main-group element). The proportion of an additive element is preferably 20 atomic percent or less (or 0 to 20 atomic percent) of Na sites. Preferably, 80 atomic percent or more of the element Me (for example, 80 to 100 atomic percent) is composed of Ni, Ti, Mn, Fe, and/or Co.

In a preferred embodiment, the sodium-containing transition metal oxide has a structure in which $MeO_2$ layers having oxygen arrays are stacked. In the P2-type crystal structure, sodium occupies triangular prismatic sites between $MeO_2$ layers. In the O3-type crystal structure, sodium occupies six-coordinated octahedral sites between $MeO_2$ layers. The sodium-containing transition metal oxide has the stacked structure and thus can reversibly intercalate and deintercalate sodium ions. Specifically, sodium ions are intercalated between the $MeO_2$ layers at the time of discharge, and sodium ions are deintercalated from between the $MeO_2$ layers at the time of charge.

In the sodium-containing transition metal oxide, in the case that the stoichiometric ratio of Na to the element Me is denoted by $x_q$, x in formula (1) satisfies, for example, 0.97 $x_q \leq x \leq 1.03$ $x_q$, and x may satisfy 0.98 $x_q \leq x \leq 1.02$ $x_q$. The sodium-containing transition metal oxide having such an x-value can intercalate and deintercalate sodium ions reversibly and stably.

Regarding the sodium-containing transition metal oxide represented by formula (1) (or formula (1a)), the stoichiometric ratio $x_q$ of Na to the element Me is a value depending on the type of crystal structure. In the case where the sodium-containing transition metal oxide has a P2-type layered crystal structure, $x_q$ is 2/3. In the case where the sodium-containing transition metal oxide has an O3-type layered crystal structure, $x_q$ is 1.

Regarding the element Me, a combination of Ni and at least one selected from the group consisting of Ti, Mn, Fe, and Co is preferred. Of these, a combination of Ni, Ti, and Mn is preferred. In the case where the element Me is such a combination, the crystal structure of the sodium-containing transition metal oxide is preferably a P2-type layered crystal structure (that is, $x_q$ is 2/3). In the case where the sodium-containing transition metal oxide has a P2-type layered crystal structure and where the element Me is a combination of Ni, Ti, and Mn, the sodium-containing transition metal oxide is referred to as a "first oxide", in some cases. In the first oxide, the stoichiometric ratio of Ni to Ti to Mn is preferably 1/3:1/6:1/2.

In the first oxide, the ratio of Ni to Ti to Mn is not limited to the stoichiometric ratio and may vary to some extent. Specifically, the proportion of each of the elements, Ni, Ti, and Mn, may be in the range of, for example, 90 to 110 atomic percent or 95 to 105 atomic percent when the stoichiometric amount of each element is defined as 100 atomic percent. However, the sum total of the ratios of Ni, Ti, and Mn is desirably 1.

Regarding the element Me, a combination of Fe and at least one selected from the group consisting of Ti, Mn, and Co is also preferred. Of these, a combination of Fe and Co is preferred. In the case where the element Me is such a combination, the crystal structure of the sodium-containing transition metal oxide is preferably an O3-type layered crystal structure (that is, $x_q$ is 1). In the case where the sodium-containing transition metal oxide has an O3-type layered crystal structure and where the element Me is a combination of Fe and Co, the sodium-containing transition metal oxide is referred to as a "second oxide", in some cases. In the second oxide, the stoichiometric ratio of Fe to Co is preferably 1/2:1/2.

In the second oxide, the ratio of Fe to Co is not limited to the stoichiometric ratio and may vary to some extent. The proportion of each of the elements, Fe and Co, may be in the range of, for example, 90 to 110 atomic percent or 95 to 105 atomic percent when the stoichiometric amount of each element is defined as 100 atomic percent. However, the sum total of the ratios of Fe and Co is desirably 1. Specifically, the ratio of Fe to Co in the second oxide is preferably 0.45:0.55 to 0.55:0.45 and more preferably 0.475:0.525 to 0.525:0.475.

The first oxide content and/or second oxide content of the positive electrode active material is preferably high. The first oxide and/or second oxide may be combined with a positive electrode active material other than these oxides. Regarding the first oxide content and the second oxide content of the positive electrode active material, the total first oxide and second oxide content is preferably, for example, 80% to 100% by mass or 90% to 100% by mass.

(Conductive Assistant)

Examples of the conductive assistant include, but are not particularly limited to, carbon black, graphite, carbon fibers (for example, vapor-grown carbon fibers), and/or carbon nanotubes. From the viewpoint of increasing conductivity, particles of the positive electrode active material may be covered with the conductive assistant. The covering with the conductive assistant may be performed by the application of the conductive assistant to surfaces of the particles of the positive electrode active material, mechanochemical processing (including mechanofusion processing), or the like.

The amount of the conductive assistant may be appropriately selected in the range of, for example, 1 to 25 parts by mass and may be 5 to 20 parts by mass with respect to 100 parts by mass of the positive electrode active material.

The positive electrode may be formed by allowing the positive electrode mixture that contains the positive electrode active material, the conductive assistant, the binder, and the carboxylic acid to be supported on the positive electrode current collector, performing pressing in the thickness direction of the positive electrode current collector, and drying the resulting pressed article. The positive electrode mixture is typically used in the form of a slurry. The positive electrode mixture slurry is prepared by dispersing constituent components of the positive electrode mixture in a dispersion medium. The mixing order of these components is not particularly limited. All components may be mixed in one step. Some components may be mixed in advance, and then the remaining components may be added to and mixed with the resulting mixture. From the viewpoint of inhibiting gelation of the binder, preferably, the carboxylic acid is mixed with the positive electrode active material or the binder in advance, and then the binder or the positive electrode active material is added to and mixed with the resulting mixture. Particularly preferably, the carboxylic acid is mixed with the binder in advance, and then the positive electrode active material is added to and mixed with the resulting mixture.

As the dispersion medium, for example, an organic solvent, such as N-methyl-2-pyrrolidone (NMP), is preferably used. A solvent mixture of the organic solvent and water may be used, as needed.

The positive electrode current collector may be formed of metal foil or a metal porous body (for example, a nonwoven fabric composed of metal fibers, and/or a porous metal sheet). As the metal porous body, a metal porous body having a three-dimensional mesh-like skeleton (in particular, a hollow skeleton) may be used. The material of the positive electrode current collector is preferably, but not particularly limited to, for example, aluminum and/or an aluminum alloy in view of stability at a positive-electrode potential. The metal foil has a thickness of, for example, 10 to 50 μm. The metal porous body has a thickness of, for example, 100 to 2000 μm.

In the case where the positive electrode current collector is formed of metal foil, the positive electrode mixture slurry is applied to a surface of the metal foil. In the case where the positive electrode current collector is formed of a metal porous body, the positive electrode mixture slurry may be applied to a surface of the metal porous body or charged into the metal porous body. Since the gelation of the positive electrode mixture slurry is inhibited, the positive electrode mixture slurry is easily applied to or charged into the positive electrode current collector to form a uniform coating film.

A drying temperature at which the pressed article is dried is, for example, 100° C. to 150° C. and may be 135° C. to 150° C. or 140° C. to 150° C. When whichever of the boiling point and the thermal decomposition point of the carboxylic acid is lower is higher than 150° C., drying at such a temperature does not lead to vaporization or decomposition of the carboxylic acid, thereby inhibiting the progress of gelation after the positive electrode mixture is supported on the positive electrode current collector. In the resulting positive electrode, the constituent components are highly dispersed to inhibit an increase in contact resistance and a reduction in conductivity. Thereby, in the sodium ion secondary battery, a reduction in discharge capacity in early stages is inhibited. Furthermore, when a charge-discharge cycle is repeated, the peeling off of the positive electrode mixture and the detachment of particles of the positive electrode active material are inhibited, thus inhibiting the degradation of the cycle characteristics.

The pressing may be performed by, for example, feeding the positive electrode current collector on which the positive electrode mixture is supported between a pair of rolls and performing rolling with the rolls.

After the positive electrode mixture is supported on the positive electrode current collector and before performing pressing, drying treatment may be performed. In this case, the drying temperature may be lower than the temperature at which the pressed article is dried. The drying temperature is, for example, 50° C. to 100° C. and may be 60° C. to 80° C.

(Sodium Ion Secondary Battery)

The positive electrode according to the foregoing embodiment of the present invention may be combined with a negative electrode, a separator, and an electrolyte having sodium ion conductivity into a sodium ion secondary battery.

The constituent components other than the positive electrode for the sodium ion secondary battery will be described in detail below.

(Negative Electrode)

The negative electrode contains a negative electrode active material. The negative electrode may include a negative electrode current collector and the negative electrode active material (or a negative electrode mixture) supported on the negative electrode current collector.

The negative electrode current collector may be formed of metal foil or a metal porous body as described about the positive electrode current collector. A material for the negative electrode current collector is preferably, but not particularly limited to, copper, a copper alloy, nickel, a nickel alloy, and/or stainless steel because they are not alloyed with sodium and are stable at a negative-electrode potential. The thickness of the negative electrode current collector may be appropriately selected from the range described in the case of the positive electrode current collector.

Examples of the negative electrode active material include materials that reversibly intercalate and deintercalate sodium ions; and materials that are alloyed with sodium. The capacity of each of the materials is provided by Faradaic reactions.

Examples of the negative electrode active material include metals, such as sodium, titanium, zinc, indium, tin, silicon, alloys thereof, and compounds thereof; and carbonaceous materials. The alloys may further contain, for example, another alkali metal and/or alkaline-earth metal other than these metals.

Examples of the metal compounds include lithium-containing titanium oxide, such as lithium titanate (for example, $Li_2Ti_3O_7$ and/or $Li_4Ti_5O_{12}$); and sodium-containing titanium oxide, such as sodium titanate (for example, $Na_2Ti_3O_7$ and/or $Na_4Ti_5O_{12}$). In the lithium-containing titanium oxide (or sodium-containing titanium oxide), part of titanium and/or part of lithium (or sodium) may be replaced with another element.

Examples of the carbonaceous materials include graphitizable carbon (soft carbon) and/or non-graphitizable carbon (hard carbon).

These negative electrode active materials may be used separately or in combination of two or more.

Among these materials, the foregoing compounds (for example, sodium-containing titanium oxide) and/or the carbonaceous materials (for example, hard carbon) are preferred.

The negative electrode may be formed by, for example, allowing the negative electrode mixture containing the negative electrode active material to be supported on (specifically, applied to or charged into) the negative electrode current collector, performing drying, and pressing (or rolling) the resulting dry article in the thickness direction. The pressed article may be further dried. As the negative electrode, a component obtained by depositing a film of the negative electrode active material on a surface of the negative electrode current collector by a gas-phase method, for example, evaporation or sputtering may be used. A metal or an alloy in the form of a sheet may be directly used as the negative electrode or may be press-bonded to a current collector before use as the negative electrode. The negative electrode active material may be pre-doped with sodium ions, as needed.

The negative electrode mixture may further contain a conductive assistant and/or a binder in addition to the negative electrode active material. The negative electrode mixture is typically used in the form of a slurry (or paste) containing a dispersion medium.

The conductive assistant may be appropriately selected from those exemplified for the positive electrode. The amount of the conductive assistant with respect to the negative electrode active material may be appropriately selected in the range exemplified for the positive electrode.

Examples of the dispersion medium include organic solvents, such as NMP, and/or water.

The type of the binder is not particularly limited. Examples of the binder that may be used include fluororesins, such as polyvinylidene fluoride and polytetrafluoroethylene; chlorine-containing vinyl resins, such as polyvinyl chloride; polyolefin resins; rubbery polymers, such as styrene-butadiene rubber; polyamide resins (for example, aromatic polyamide); polyimide resins, such as polyimide and polyamide-imide; polyvinyl pyrrolidone; polyvinyl alcohol; and cellulose derivatives [for example, cellulose ethers (carboxyalkylcellulose and alkali metal salts thereof, such as carboxymethylcellulose and sodium salts thereof)]. These binders may be used separately or in combination of two or more.

The amount of the binder is not particularly limited and may be selected in the range of, for example, about 0.5 to about 15 parts by mass and preferably 1 to 12 parts by mass with respect to 100 parts by mass of the negative electrode active material from the viewpoint of easily achieving high bondability and capacity.

(Separator)

The separator is arranged between the positive electrode and the negative electrode. As the separator, for example, a microporous membrane composed of a resin and/or a nonwoven fabric may be used. The material of the separator may be selected in consideration of the operating temperature of the battery. Examples of a resin contained in fibers constituting the microporous membrane or the nonwoven fabric include polyolefin resins, polyphenylene sulfide resins, polyamide resins (for example, aromatic polyamide resins), and/or polyimide resins. The fibers constituting the nonwoven fabric may be inorganic fibers, such as glass fibers. The separator may contain an inorganic filler, such as ceramic particles. The separator may be coated with the inorganic filler.

The thickness of the separator is not particularly limited and may be selected in the range of, for example, about 10 to about 300 μm.

(Electrolyte)

As the electrolyte, a sodium-ion-conducting nonaqueous electrolyte, specifically, a sodium ion-containing nonaqueous electrolyte, is used. Examples of the nonaqueous electrolyte that is used include an electrolyte (organic electrolyte) in which a salt (sodium salt) of a sodium ion and an anion is dissolved in an organic solvent; and an ionic liquid (molten salt electrolyte) containing a cation (cation containing a sodium ion) and an anion. A battery including a molten salt electrolyte is referred to as a molten salt battery. The molten salt electrolyte is an electrolyte mainly composed of an ionic liquid. The ionic liquid is defined as a salt in a molten state (molten salt) and is a liquid ionic substance containing an anion and a cation. A battery containing a sodium-ion-conducting molten salt as an electrolyte, sodium ions serving as charge carriers that participate in charge-discharge reactions, refers to a sodium molten salt battery.

An organic solvent-containing electrolyte (organic electrolyte) is preferably used in view of low-temperature characteristics and so forth. An electrolyte containing an ionic liquid is preferably used from the viewpoint of minimizing the decomposition of the electrolyte. An electrolyte containing the ionic liquid and the nonaqueous solvent may be used.

The concentration of a sodium salt or sodium ions in the electrolyte may be appropriately selected in the range of, for example, 0.3 to 10 mol/L.

(Organic Electrolyte)

The organic electrolyte may contain, for example, an ionic liquid and/or an additive, in addition to an organic solvent and a sodium salt. The total contents of the organic solvent and the sodium salt in the electrolyte is, for example, 60% by mass or more, preferably 75% by mass or more, and more preferably 85% by mass or more. The total contents of the organic solvent and the sodium salt in the electrolyte may be, for example, 100% by mass or less or 95% by mass or less. These lower limit values and the upper limit values may be freely combined together. The total contents of the organic solvent and the sodium salt in the electrolyte may be, for example, 60% to 100% by mass or 75% to 95% by mass.

Examples of the type of the anion (first anion) contained in the sodium salt include, but are not particularly limited to, anions of fluorine-containing acids [such as fluorine-containing phosphate anions, e.g., a hexafluorophosphate ion, and fluorine-containing borate anions, e.g., a tetrafluoroborate ion]; anions of chlorine-containing acids [such as a perchlorate ion]; anions of oxalate group-containing oxygen acids [such as oxalato borate ions, e.g., a bis(oxalato)borate ion $(B(C_2O_4)_2^-)$, and oxalato phosphate ions, e.g., a tris(oxalato)phosphate ion $(P(C_2O_4)_3^-)$]; fluoroalkanesulfonate anions [such as a trifluoromethanesulfonate ion $(CF_3SO_3^-)$]; and bis(sulfonyl)amide anions.

A single type of the sodium salt may be used alone. Alternatively, two or more types of the sodium salts having different first anions may be used in combination.

Examples of the bis(sulfonyl)amide anions include a bis(fluorosulfonyl)amide anion (FSA), a (fluorosulfonyl)(perfluoroalkylsulfonyl)amide anion [such as $(FSO_2)$ $(CF_3SO_2)N^-$], and a bis(perfluoroalkylsulfonyl)amide anion [such as a bis(trifluoromethylsulfonyl)amide anion (TFSA: $N(SO_2CF_3)_2^-$) and $N(SO_2C_2F_5)_2^-$]. Of these, in particular, FSA and/or TFSA is preferred.

The organic solvent is not particularly limited. Known organic solvents used for sodium ion secondary battery may be used. Examples of the organic solvent that may be preferably used in view of ionic conductivity include cyclic carbonates, such as ethylene carbonate, propylene carbonate, and butylene carbonate; chain carbonates, such as dimethyl carbonate, diethyl carbonate, and ethyl methyl carbonate; and cyclic carbonate, such as y-butyrolactone. These organic solvents may be used alone or in combination of two or more.

(Molten Salt Electrolyte)

In the case where the molten salt electrolyte containing an ionic liquid is used as the nonaqueous electrolyte, the nonaqueous electrolyte may contain, for example, an organic solvent and/or an additive, in addition to the ionic liquid containing a cation and an anion. Preferably, the electrolyte does not contain an organic solvent. If the electrolyte contains an organic solvent, the organic solvent content of the electrolyte is preferably 30% by mass or less and more preferably 20% by mass or less or 10% by mass or less.

The molten salt electrolyte (or its cation) may contain a cation (third cation) other than a sodium ion, in addition to a sodium ion (second cation). Examples of the third cation include organic cations and inorganic cations other than a sodium ion. The molten salt electrolyte (or its cation) may contain a single type of the third cation or may contain two or more types of the third cations in combination.

Examples of organic cations include cations derived from aliphatic amines, alicyclic amines, and aromatic amines (such as quaternary ammonium cations); nitrogen-containing onium cations, such as cations having nitrogen-containing heterocycles (i.e., cations derived from cyclic amines); sulfur-containing onium cations; and/or phosphorus-containing onium cations.

Among nitrogen-containing organic onium cations, in particular, a quaternary ammonium cation and a cation having a pyrrolidine, pyridine, or imidazole skeleton serving as a nitrogen-containing heterocyclic skeleton are preferred.

Specific examples of the nitrogen-containing organic onium cations include tetraalkylammonium cations, such as a tetraethylammonium cation (TEA) and a methyltriethylammonium cation (TEMA); a 1-methyl-1-propylpyrrolidinium cation (MPPY or Py13) and a 1-butyl-1-methylpyrrolidinium cation (MBPY or Py14); and/or a 1-ethyl-3-methylimidazolium cation (EMI) and a 1-butyl-3-methylimidazolium cation (BMI).

Examples of the inorganic cations include alkali metal ions other than a sodium ion (such as a potassium ion); alkaline-earth metal ions (such as a magnesium ion and a calcium ion); and/or an ammonium ion.

The molten salt electrolyte (or its cation) preferably contains an organic cation. The use of the organic cation-containing ionic liquid reduces the melting point and/or viscosity of the molten salt electrolyte. This easily increases the sodium-ion conductivity and easily ensures high capacity. The molten salt electrolyte (or its cation) may contain an organic cation and an inorganic cation, as the third cation.

As the anion, a bis(sulfonyl)amide anion is preferably used. The bis(sulfonyl)amide anion may be appropriately selected from the anions exemplified for the organic electrolyte. Among bis(sulfonyl)amide anions, in particular, FSA and/or TFSA is preferred.

The ionic liquid contains a salt (first salt) of a sodium ion (second cation) and an anion (second anion) and may contain a salt (second salt) of a third cation and an anion (third anion), as needed. The first salt may be composed of a single type of salt or two or more types of salts having different second anions. The second salts may be composed of a single type of salt or two or more types of salts having different third cations and/or different third anions. The second and third anions may be appropriately selected from the foregoing anions.

Among the first salts, for example, a salt (Na.FSA) of a sodium ion and FSA, and/or a salt (Na.TFSA) of a sodium ion and TFSA is particularly preferred.

Specific examples of the second salt include a salt (Py13.FSA) of Py13 and FSA, a salt (Py13.TFSA) of PY13 and TFSA, a salt (Py14.FSA) of Py14 and FSA, a salt (Py14.TFSA) of PY14 and TFSA, a salt (BMI.FSA) of BMI and FSA, a salt (BMI.TFSA) of BMI and TFSA, a salt (EMI.FSA) of EMI and FSA, a salt (EMI.TFSA) of EMI and TFSA, a salt (TEMA.FSA) of TEMA and FSA, a salt (TEMA.TFSA) of TEMA and TFSA, a salt (TEA.FSA) of TEA and FSA, and a salt (TEA.TFSA) of TEA and TFSA. These second salts may be used separately or in combinations of two or more.

The proportion of the first salt in the total of the first salt and the second salt (i.e., the proportion of the sodium ion in the total of the sodium ion and the third cation) may be appropriately selected, depending on the type of salt, and may be appropriately selected in the range of, for example, 5% to 95% by mole.

In the case where the third cation is an organic cation, the proportion of the first salt is preferably 10% by mole or more, 15% by mole or more, 20% by mole or more, or 25% by mole or more, and more preferably 30% by mole or more or 40% by mole or more. The proportion of the first salt is preferably 65% by mole or less and more preferably 55% by mole or less. The molten salt electrolyte has relatively low viscosity, thus easily achieving high capacity. These lower limit values and the upper limit values may be freely combined together to set a preferred range. For example, the proportion of the first salt may be 10% to 65% by mole, 15% to 55% by mole, or 25% to 55% by mole.

The operating temperature of the sodium molten salt battery may be adjusted by the composition of the molten salt electrolyte. The sodium molten salt battery may operate in a wide temperature range of, for example, −20° C. to a temperature higher than 90° C.

The sodium ion secondary battery may be produced by, for example, (a) a step of forming an electrode assembly including a positive electrode, a negative electrode, and a separator provided between the positive electrode and the negative electrode and (b) a step of arranging the electrode assembly and an electrolyte in a battery case. A coin-type or button-type battery may be produced by arranging one of a positive electrode and a negative electrode in a battery case, arranging a separator thereon, injecting an electrolyte, arranging the other electrode, and sealing the battery case.

FIG. 1 is a longitudinal sectional view schematically illustrating a sodium ion secondary battery according to an embodiment of the present invention. The sodium ion secondary battery includes a stacked electrode assembly, an electrolyte (not illustrated), and a prismatic aluminum battery case 10 that accommodates these components. The battery case 10 includes a case main body 12 having an open top and a closed bottom; and a lid member 13 that closes the top opening.

When the sodium molten salt battery is assembled, positive electrodes 2 and negative electrodes 3 are stacked with separators 1 provided therebetween to form an electrode assembly, and the electrode assembly is inserted into the case main body 12 of the battery case 10. Then a step of filling gaps between the separators 1, the positive electrodes 2, and the negative electrodes 3 constituting the electrode assembly with an electrolyte is performed by charging an electrolyte into the case main body 12. Alternatively, when the electrolyte is a molten salt electrolyte, the electrode assembly may be impregnated with the molten salt electrolyte, and then the electrode assembly containing the molten salt electrolyte may be housed in the case main body 12.

A safety valve 16 is provided in the middle of the lid member 13. The safety valve 16 releases a gas generated inside when the internal pressure of the battery case 10 increases. An external positive electrode terminal 14 passing through the lid member 13 is provided on one side portion of the lid member 13 with respect to the safety valve 16. An external negative electrode terminal passing through the lid member 13 is provided on the other side portion of the lid member 13.

The stacked electrode assembly includes the positive electrodes 2, the negative electrodes 3, and the separators 1 provided therebetween, each of the positive electrodes 2 and the negative electrodes 3 having a rectangular sheet shape. In FIG. 1, each of the separators 1 has a bag form so as to surround a corresponding one of the positive electrodes 2. However, the form of each separator is not particularly limited. The positive electrodes 2 and the negative electrodes 3 are alternately stacked in the stacking direction in the electrode assembly.

A positive electrode lead strip 2a may be arranged on an end portion of each of the positive electrodes 2. The positive electrode lead strips 2a of the positive electrodes 2 are bundled and connected to the external positive electrode terminal 14 provided on the lid member 13 of the battery case 10, so that the positive electrodes 2 are connected in parallel. Similarly, a negative electrode lead strip 3a may be arranged on an end portion of each of the negative electrodes 3. The negative electrode lead strips 3a of the negative electrodes 3 are bundled and connected to the external negative electrode terminal provided on the lid member 13 of the battery case 10, so that the negative electrodes 3 are connected in parallel. The bundle of the positive electrode lead strips 2a and the bundle of the negative electrode lead strips 3a are preferably arranged on left and right sides of one end face of the electrode group with a distance kept between the bundles so as not to come into contact with each other.

Each of the external positive electrode terminal 14 and the external negative electrode terminal is columnar and has a screw groove at least in the externally exposed portion. A nut 7 is engaged with the screw groove of each terminal. The nut 7 is screwed to secure the nut 7 to the lid member 13. A collar portion 8 is arranged in a portion of each terminal inside the battery case 10. Screwing the nut 7 allows the collar portion 8 to be secured to the inner surface of the lid member 13 with an O-ring-shaped gasket 9.

The electrode assembly is not limited to the stack type and may be formed by winding a positive electrode and a negative electrode with a separator provided therebetween. From the viewpoint of preventing the deposition of metallic sodium on the negative electrode, the dimensions of the negative electrode may be larger than those of the positive electrode.

EXAMPLES

The present invention will be specifically described below on the basis of an example and comparative examples. However, the present invention is not limited to these examples described below.

Example 1

(1) Production of Positive Electrode $NaFe_{0.5}Co_{0.5}O_2$ (positive electrode active material), acetylene black (conductive assistant), an NMP solution of PVDF (binder), and citric acid were mixed together to prepare a positive electrode mixture slurry. In this case, the ratio by mass of the positive electrode active material to the conductive assistant to the binder to the citric acid was 100:5.4:3.3:0.5. The positive electrode mixture slurry was applied to a surface of aluminum foil having a thickness of 20 μm, dried at atmospheric pressure and 70° C., and pressed to produce a positive electrode having a thickness of 80 μm. The positive electrode was punched into a coin form having a diameter of 12 mm and further dried at 150° C. for 16 hours.

(2) Assembly of Sodium Ion Secondary Battery (Half Cell)

A metal sodium disk (manufactured by Aldrich, thickness: 200 μm) was press-bonded to an aluminum current collector to produce a negative electrode having a total thickness of 220 μm. The negative electrode was punched into a coin form having a diameter of 12 mm.

The coin-form negative electrode and a separator were sufficiently dried by heating at 90° C. or higher and a reduced pressure of 0.3 Pa. Subsequently, the coin-formed negative electrode was placed in a shallow cylindrical Al/stainless steel-clad case. The coin-formed positive electrode was placed thereon with the coin-formed separator provided therebetween. A predetermined amount of an electrolyte was injected into the case. Then the opening of the case was sealed with a shallow cylindrical Al/stainless steel-clad sealing plate having an insulating gasket at its circumference. As a result, a pressure is applied to an electrode assembly including the negative electrode, the separator, and the positive electrode between the bottom of the case and the sealing plate. This ensured that the components were brought into contact with one another. Thereby, a coin-formed sodium molten salt battery having a design capacity of 1.5 mAh was produced. As the separator, a silica-coated nonwoven fabric composed of polyolefin (NPS, manufactured by Nippon Sheet Glass Co., Ltd., thickness: 50 μm) was used. As the electrolyte, an ionic liquid (the ionic liquid content of the electrolyte: 100% by mass) containing Na.FSA and Py13.FSA in a molar ratio of 40:60 was used.

Comparative Example 1

A positive electrode mixture slurry was prepared as in Example 1, except that citric acid was not used.

Comparative Example 2

A positive electrode and a sodium ion secondary battery were produced as in Example 1, except that maleic acid (boiling point and thermal decomposition point: 135° C.) was used in place of citric acid.

Comparative Example 3

A positive electrode and a sodium ion secondary battery were produced as in Example 1, except that malonic acid (thermal decomposition point: 140° C., no boiling point) was used in place of citric acid.

<<Evaluation>>

(a) Gelation of Positive Electrode Mixture Slurry

Positive electrode mixture slurries were prepared in the same procedures as in the example and the comparative examples and immediately transferred into polypropylene containers. Each of the positive electrode mixtures in the containers was stirred with a spatula every five minutes from the preparation of the slurry, and the degree of gelation was examined.

(b) Amount of Carboxylic Acid Left in Positive Electrode

To each of positive electrodes produced in the same procedure as in item (1), 20 ml of ultrapure water was added. Extraction was performed at 80° C. for 60 minutes. Quantitative analysis of anions was performed by ion chromatography to determine the amount of carboxylic acid left in each positive electrode. The amount left was calculated as mass per unit projected area (μg/cm²) of the positive electrode. The term "projected area of the positive electrode" is defined as the area of a shadow cast when the positive electrode is projected in the thickness direction.

Table 1 lists the results of Evaluations (a) and (b). Example 1 is denoted by A1, Comparative examples 1 to 3 are denoted by B1 to B3, respectively.

TABLE 1

| | Carboxylic acid | Gelation time | Amount of carboxylic acid left in positive electrode (μg/cm²) |
|---|---|---|---|
| A1 | citric acid | >60 min. | 307.5 |
| B1 | — | <5 min. | — |
| B2 | maleic acid | >60 min. | 21.0 |
| B3 | malonic acid | >60 min. | 30.9 |

In Example 1 and Comparative examples 2 and 3 in which the carboxylic acids were used, each of the positive electrode mixture slurries did not gel even 60 minutes after the preparation. In these examples, the slurry form of each of the positive electrode mixtures was maintained even 60 minutes after the preparation of the slurry. When the mixtures were stirred, the mixtures stuck to wall surfaces of the containers.

In contrast, in Comparative example 1 in which carboxylic acid was not added, gelation occurred less than 5 minutes after the preparation of the slurry. The gelled positive electrode mixture come off cleanly from a wall surface of the container and was formed into a jelly-like lump. The adhesion of the slurry was reduced. In Comparative example 1, it was impossible to produce a positive electrode because of significant gelation.

Even after drying at 150° C., a large amount of citric acid was left in the positive electrode in Example 1. In contrast, the amount of the carboxylic acid (maleic acid or malonic acid) left in each of the positive electrodes in Comparative examples 2 and 3 was 1/10 or less of that in Example 1.

(c) Discharge Capacity and Cycle Characteristics in Early Stages

The sodium ion secondary batteries were heated to 60° C. Operations described in (i) and (ii) were regarded as one cycle of charge-discharge cycling. The sodium ion secondary batteries were subjected to the charge-discharge cycling. In each cycle, the charge capacity and the discharge capacity were determined and converted into the charge capacity and the discharge capacity per unit mass (mAh/g) of the positive electrode active material. The charge capacity (mAh/g) and the discharge capacity (mAh/g) up to the 8th cycle were compared with each other and were evaluated as an index of early-stage characteristics.

(i) Charging to an upper-limit voltage (charge cutoff voltage) of 3.8 V at a current of 0.2 C.
(ii) Discharging to a lower-limit voltage (discharge cutoff voltage) of 2 V at a current of 0.2 C.

A change in discharge capacity (mAh/g) as a function of the number of cycles was examined and used as an index of the cycle characteristics.

Figure 2:
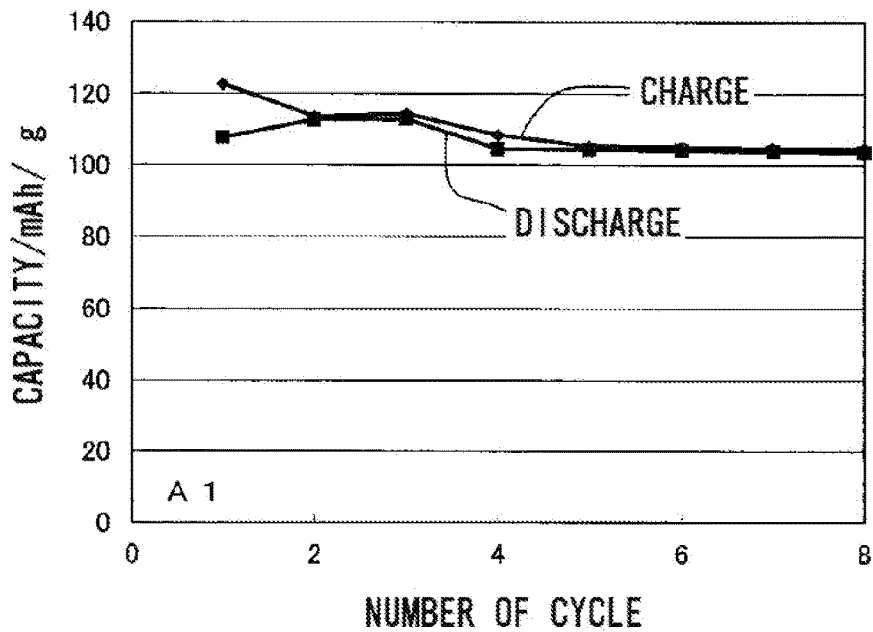
FIG. 2 is a graph illustrating changes in the charge capacity and the discharge capacity of a sodium ion secondary battery of Example 1 in early stages of charge and discharge.
Figure 3:
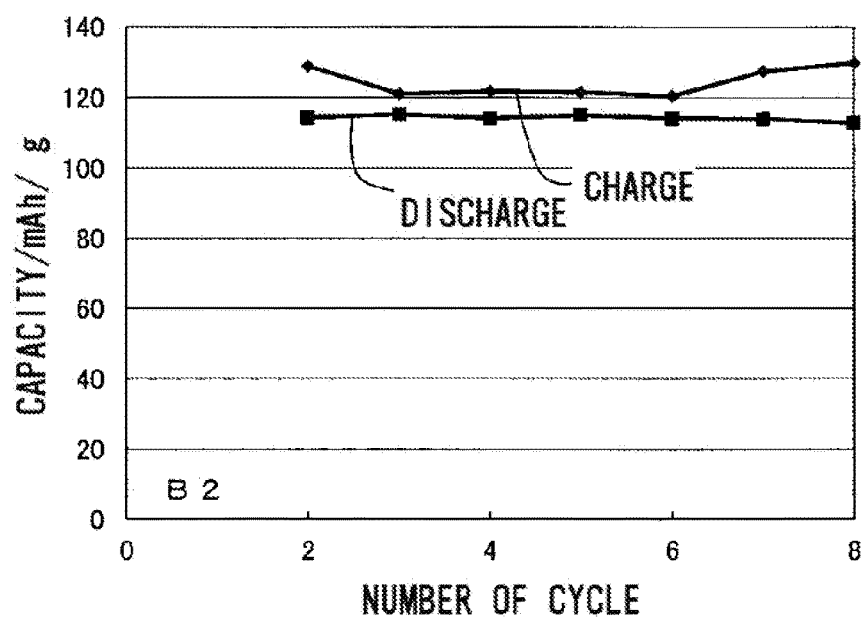
FIG. 3 is a graph illustrating changes in the charge capacity and the discharge capacity of a sodium ion secondary battery of Comparative example 2 in early stages of charge and discharge.
Figure 4:
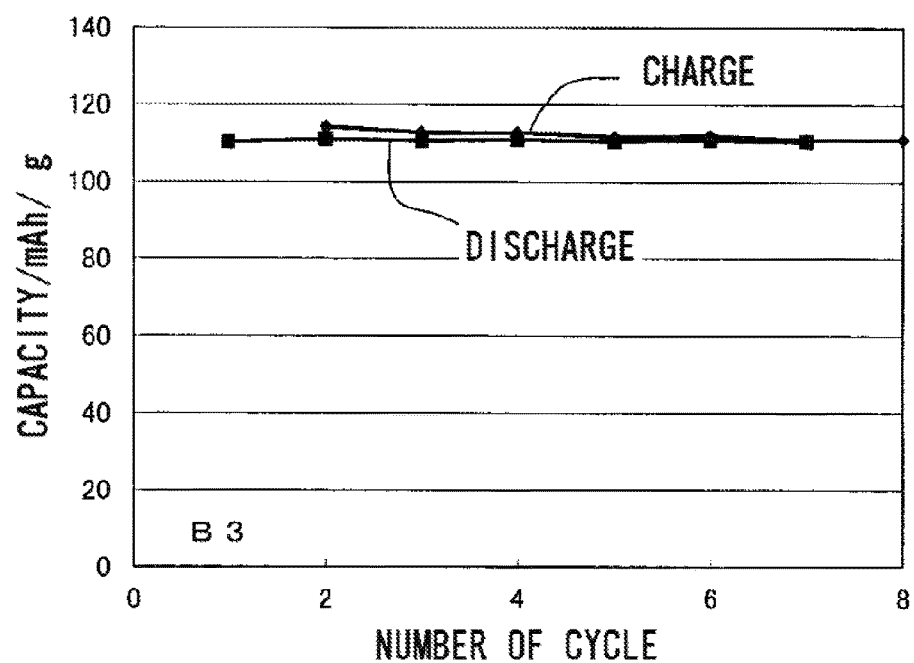
FIG. 4 is a graph illustrating changes in the charge capacity and the discharge capacity of a sodium ion secondary battery of Comparative example 3 in early stages of charge and discharge.

Changes in the charge capacity and the discharge capacity (mAh/g) of Example 1 and Comparative examples 2 and 3 in early stages of the charge and discharge are illustrated in FIGS. 2 to 4 respectively. FIGS. 2 and 4 indicate that in Example 1 and Comparative example 3, the charge capacity is little different from the discharge capacity in early stages, and a reduction in discharge capacity in early stage is inhibited. Referring to FIG. 3, in Comparative example 2 in which maleic acid was used, the discharge capacity is lower than the charge capacity in early stages of the charge and discharge. The reduction in discharge capacity is seemingly caused by some sort of side reaction with the participation of, for example, maleic acid or its decomposition product.

Figure 5:
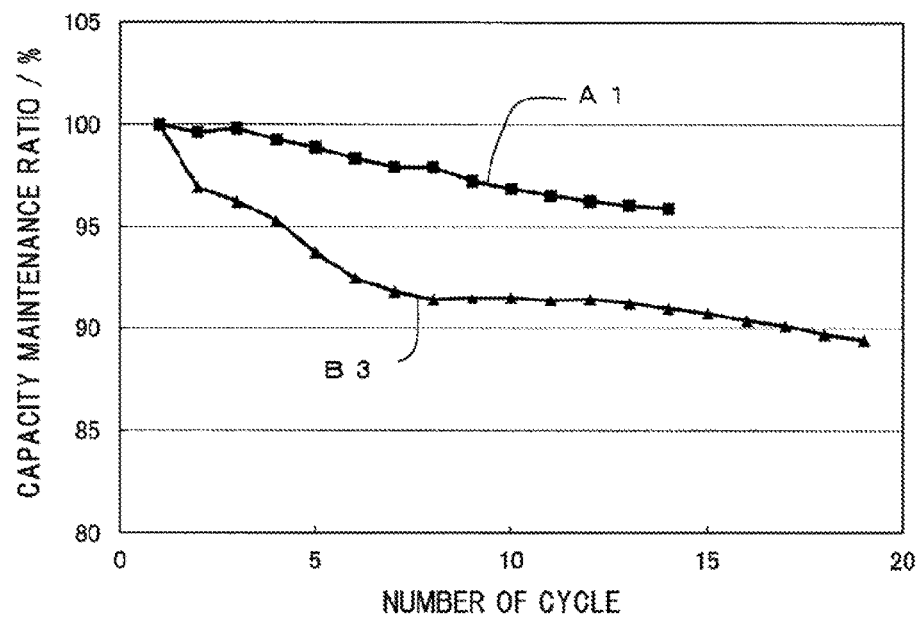
FIG. 5 is a graph illustrating changes in the discharge capacity of the sodium ion secondary batteries of Example 1 and Comparative example 3 during charge and discharge.

FIG. 5 is a graph illustrating changes in the discharge capacity (mAh/g) in Example 1 and Comparative example 3 during the charge-discharge cycling. As illustrated in FIG. 5, in Example 1 in which citric acid was added, even when the charge and discharge are repeated, a reduction in capacity is very small. As described in Table 1, a large amount of citric acid is left in the positive electrode. Nevertheless, the reduction in discharge capacity is inhibited. It is presumed that the citric acid left does not adversely affect the charge-discharge reactions of the sodium ion secondary battery. In contrast, in Comparative example 3 in which malonic acid was added, the amount of malonic acid left in the positive electrode is small. Nevertheless, the discharge capacity decreased as the charge and discharge were repeated.

INDUSTRIAL APPLICABILITY

In the positive electrode according to an embodiment of the present invention, the gelation of the positive electrode mixture is inhibited. The sodium ion secondary battery including the positive electrode has good discharge capacity and cycle characteristics in early stages and should be used for, for example, large-scale power storage apparatuses for household and industrial use and power sources for electric vehicles and hybrid vehicles.

REFERENCE SIGNS LIST 1 separator
2 positive electrode
2a positive electrode lead strip
3 negative electrode
3a negative electrode lead strip
7 nut
8 collar portion
9 gasket
10 battery case
12 case main body
13 lid member
14 external positive electrode terminal
16 safety valve

The invention claimed is:

1. A positive electrode for a sodium ion secondary battery, comprising:
a positive electrode active material that intercalates and deintercalates sodium ions, a conductive assistant, a binder, and a carboxylic acid,
the binder contains a vinylidene fluoride-based polymer,
the carboxylic acid has at least one of a boiling point and a thermal decomposition point, and whichever of the boiling point and the thermal decomposition point is lower being higher than 150° C.;
wherein the positive electrode active material contains at least one sodium-containing transition metal oxide,
the sodium-containing transition metal oxide contains a sodium-containing transition metal oxide represented by formula (1): $Na_xMeO_2$ where element Me represents at least two transition metal elements selected from the group consisting of Ni, Ti, Mn, Fe and Co and contains at least one of Ni and Fe, and x represents a proportion of Na with respect to the element Me,
the positive electrode active material contains at least one of a first oxide and a second oxide,
the first oxide comprises a sodium-containing transition metal oxide having a P2-type layered crystal structure, the element Me being a combination of Ni, Ti, and Mn, and
the second oxide comprises a sodium-containing transition metal oxide having an O3-type layered crystal structure, the element Me being a combination of Fe and Co.

2. A positive electrode for a sodium ion secondary battery, comprising:
a positive electrode active material that intercalates and deintercalates sodium ions, a conductive assistant, a binder, and a carboxylic acid,
the binder contains a vinylidene fluoride-based polymer,
the carboxylic acid has at least one of a boiling point and a thermal decomposition point, and whichever of the boiling point and the thermal decomposition point is lower being higher than 150° C.;
wherein the positive electrode active material contains at least one sodium-containing transition metal oxide,
the sodium-containing transition metal oxide contains a sodium-containing transition metal oxide represented by formula (1): $Na_xMeO_2$ where element Me represents at least two transition metal elements selected from the group consisting of Ni, Ti, Mn, Fe and Co and contains at least one of Ni and Fe, and x represents a proportion of Na with respect to the element Me,
the positive electrode active material contains at least one of a first oxide and a second oxide,
the first oxide comprises a sodium-containing transition metal oxide having a P2-type layered crystal structure, the element Me being a combination of Ni, Ti, and Mn,
the second oxide comprises a sodium-containing transition metal oxide having an O3-type layered crystal structure, the element Me being a combination of Fe and Co,
a stoichiometric ratio of Ni to Ti to Mn in the first oxide is 1/3:1/6:1/2, and
a stoichiometric ratio of Fe to Co in the second oxide is 1/2:1/2.

* * * * *